United States Patent [19]

Coan et al.

[11] Patent Number: 5,151,963
[45] Date of Patent: Sep. 29, 1992

[54] APPARATUS FOR COUPLING AN OPTICAL TRANSDUCER TO A LIGHT GUIDE

[75] Inventors: Thomas E. Coan, Los Alamos, N. Mex.; Steven P. Ahlen, Brookline, Mass.

[73] Assignee: Boston University, Boston, Mass.

[21] Appl. No.: 665,553

[22] Filed: Mar. 5, 1991

[51] Int. Cl.⁵ .......................... G02B 6/00; G02B 6/36
[52] U.S. Cl. ...................................... 385/88
[58] Field of Search ............... 385/15, 88, 92

[56] References Cited

U.S. PATENT DOCUMENTS

| | | | |
|---|---|---|---|
| 4,118,105 | 10/1978 | Voigt | 385/92 X |
| 4,741,595 | 5/1988 | Onoda et al. | 385/88 X |
| 4,844,585 | 7/1989 | Culshaw et al. | 385/92 X |
| 5,040,868 | 8/1991 | Waitl et al. | 385/88 X |

*Primary Examiner*—Akm E. Ullah
*Attorney, Agent, or Firm*—Hamilton, Brook, Smith & Reynolds

[57] ABSTRACT

An optical connection apparatus is provided for removably connecting an electro-optical device, particularly a phototube transducer, to a transparent light-conducting material. The apparatus includes a transparent optical coupling disc which is bonded to an entrance window of the transducer with a transparent epoxy. The coupling disc has a threaded stud extending from a side of the disc opposite to the side which is bonded to the transducer. A hole is formed in the transparent material and a threaded insert is secured therein. The threaded stud extending from the disc/transducer combination is then mated with the threads of the hole insert. A layer of optical grease is placed between the disc and the transparent material, and the assembly is screwed together until the disc is flush against the surface of the transparent material.

39 Claims, 2 Drawing Sheets

APPARATUS FOR COUPLING AN OPTICAL TRANSDUCER TO A LIGHT GUIDE

GOVERNMENT SUPPORT

The U.S. Government has rights in this invention by Contract No. NSF PHY 8519440 awarded by the National Science Foundation.

BACKGROUND OF THE INVENTION

Many types of electro-optical phototubes are regularly used for detecting a quantity of light passing through a transparent guide medium such as a light pipe. These phototubes typically have a flat, smooth transparent window through which light to be detected is received. To allow proper conduction of the light from the transparent material to the window of the receiving tube, the surface of the transparent material is usually ground and polished so that it is flat and smooth. The flat surface of material is then bonded to the window of the phototube.

The bond between the phototube and the transparent material is formed with with an epoxy which is strong enough to hold the two surfaces together, but which is transparent to the wavelengths of light which are to be detected with the phototube. Such a bonded connection typically provides good transmission of light between the transparent material and the phototube. However, no simple way of decoupling the phototube from the material exists. If for some reason it becomes desirable to decouple the phototube from the transparent material, the bond between the two surfaces must be severed. This requires that the epoxy joint be mechanically broken. The breaking process is inherently violent and often leads to the destruction of the phototube or the transparent material, or both.

In addition to the possibility of destroying the components of the connection, it is also usually difficult to replace the tubes due to the environment of their installation. Very often, the phototubes are installed in devices or machinery in which space is limited. In such an application, it is usually difficult if not impossible to position a temporary fixture to properly hold a phototube while it is being epoxied to the transparent material. Also, the epoxy used to connect a new phototube to the transparent material is usually abundant, and tends to seep onto other elements of the device in which the phototube is to be installed.

SUMMARY OF THE INVENTION

The present invention provides an apparatus for removably coupling an electro-optical device to a transparent material. The coupling uses a stud which extends parallel to a coupling axis and which engages a hole in which the stud is removably secured. The stud and the hole are each fixedly located relative to one of the electro-optical device and the transparent material, and are opposite to each other. Therefore, relative motion of the electro-optical device and the transparent material toward each other results in the engagement of the stud with the hole.

In a preferred embodiment, a transparent coupling element, preferably disc-shaped, is provided, and a first surface of the coupling element is secured to a window of the electro-optical device through which light is transmitted. Preferably, the first surface is secured to the window with a transparent epoxy. The stud, preferably threaded, is secured to and extends from the side of the coupling element opposite to the first surface. A hole is formed in the transparent material and engages the stud of the coupling element. Preferably, a threaded insert is secured in the hole, the insert having threads along its inner surface which mesh with the threads of the stud.

The coupling element including the stud is formed from a single piece of transparent material. In the preferred embodiment the electro-optical device is an optical transducer, and the first surface of the coupling element has an area which closely matches the photoactive area of the transducer. The stud is sized to provide enough mechanical strength to support the weight of the transducer. A layer of optical grease is applied to the surface of the transparent material. The coupling element/transducer assembly is then screwed into place flush against the surface of the transparent material. The optical grease fills any gaps between the coupling element and the transparent material, and helps to reduce reflection at the interface.

DETAILED DESCRIPTION OF A PREFERRED EMBODIMENT

Figure 1:
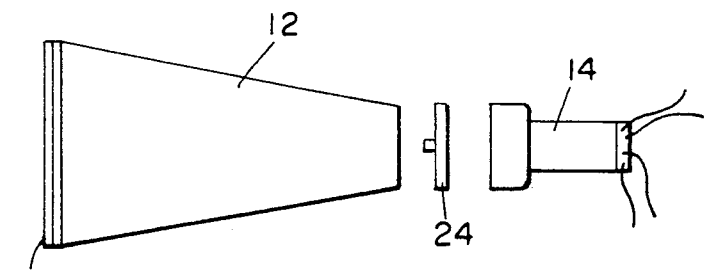
FIG. 1 is a first side view of the components of a connection having a light pipe, a phototube, and an optical coupling disc according to the present invention.
Figure 2:
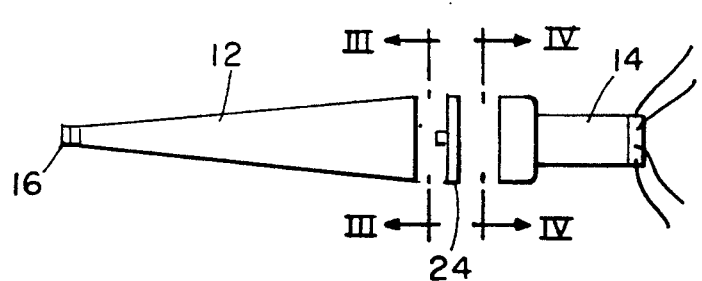
FIG. 2 is a side view of the components of FIG. 1 rotated by ninety degrees.

Shown in FIG. 1 and FIG. 2 is a "light pipe" 12 which is used for transporting light to an electro-optical transducer, which in the present embodiment is a photomultiplier tube 14. The arrangement of FIG. 1 is part of a device used for detecting and measuring the energy of atomic and sub-atomic particles. A scintillator 16 is coupled to the input side of the light pipe 12, and emits light when a particle is absorbed. The emitted light enters the input side of the light pipe and is transmitted to the output side of the light pipe to be detected by the phototube 14. The shape of the light pipe in FIG. 1 provides good transmission of light from the input side to the output side of the light pipe. However, it is noted that this shape is specific to the present embodiment, and the transparent material 12 used may be of any shape or size conducive to a particular application.

Figure 3:
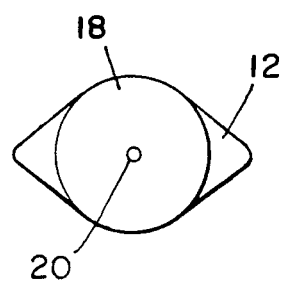
FIG. 3 is a front view of the light pipe of FIG. 1.

The output side of the light pipe has a flat surface 18 which is polished smooth. This surface is shown in the front view of FIG. 3. In preparing the light pipe 12, a hole is tapped in the center of the flat surface 18, and a metal threaded screw insert 20 is installed in the hole. In the preferred embodiment, the insert 20 is cylindrical with screw threads along its inside surface for receiving the screw threads of a threaded stud. The insert 20 may be retained in the hole of the light pipe 12 in a number of conventional ways, such as with transparent epoxy. In general, the installation of the insert 20 should inhibit the transmission of light exiting the light pipe 12 as little as possible. Alternatively, screw threads may be formed directly into the light pipe material. However, the use of the insert 20 has been found to be a simple and efficient way of supplying threads in the hole.

Figure 4:
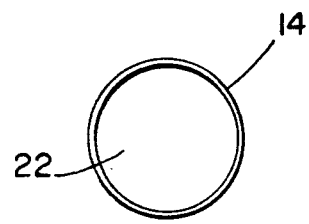
FIG. 4 is a front view of the phototube of FIG. 1.
Figure 5:
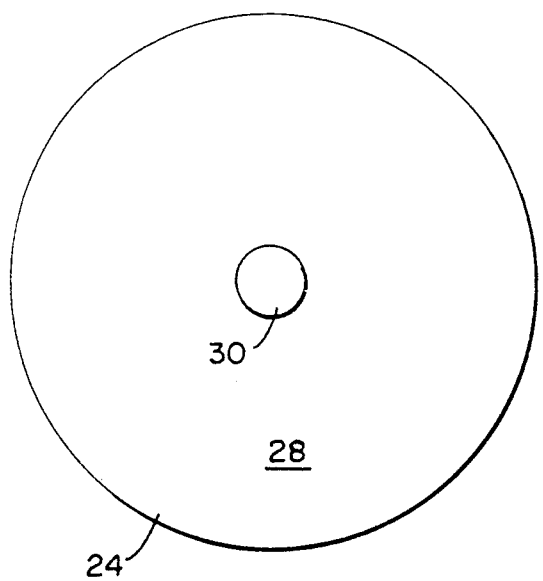
FIG. 5 is a front view of the optical coupling disc of FIG. 1.
Figure 6:
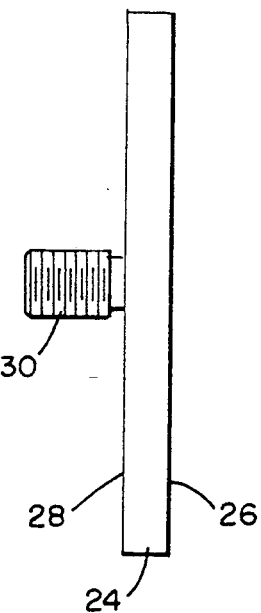
FIG. 6 is a side view of the optical coupling disc of FIG. 1.

The present invention provides a coupling joint between the light pipe 12 and phototube 14, the separation of which may be accomplished quickly and easily, without damaging the light pipe 12, the phototube 14 or any other components of the surrounding device. FIG. 4 shows the smooth front surface 22 of the entrance window of photomultiplier tube 14. To provide a way to connect the phototube 14 to the light pipe 12, an optical coupling disc 24 (shown in FIGS. 1 and 2) is used. The optical coupling disc 24 is shown in more detail in FIGS. 5 and 6. The disc 24 is generally cylindrical in shape, and has a smooth, flat surface 26 which is sized to match the surface 22 of the phototube 14. In general, it is desirable to have the area of the disc surface 26 match the photoactive area of the electro-optic transducer being used. The opposite side of the disc 24 also has a smooth, flat surface 28. However, from the middle of the surface 28 extends a threaded stud 30. The stud 30 is cylindrically-shaped, and has external threads which are sized to mesh with the threads of the insert 20 of the light pipe 12.

Figure 7:
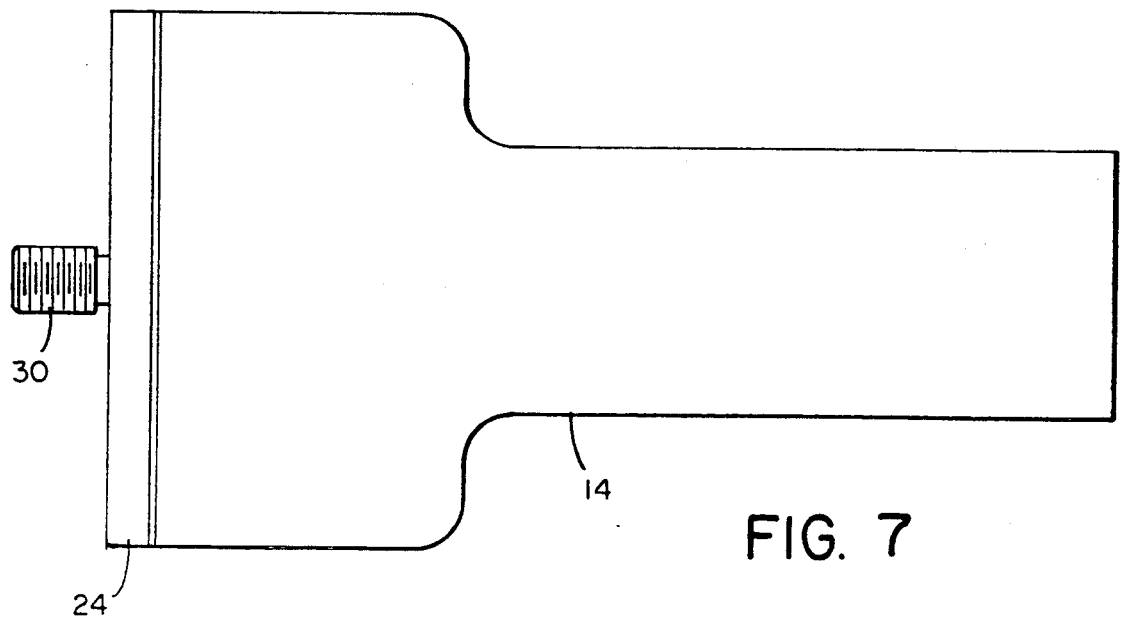
FIG. 7 is a side view of the phototube and optical coupling disc of FIG. 1 bonded together with epoxy.

Initially, the disc 24 is affixed to the phototube 14, as shown in FIG. 7. The surface 26 of the disc 24 is carefully aligned with the window surface 22 of the phototube 14. Epoxy is used to secure the disc 24 to the phototube 14, and to fill any gaps resulting from imperfections in either of the surfaces 22, 26. The epoxy used is of a type which is transparent to the wavelengths of light to be detected by the phototube 14. In the preferred embodiment, the epoxy used is of a polyurethane base and is flexible when dry. This flexibility of the epoxy increases the ability of the joint to absorb and withstand mechanical shock. The epoxy is also of a dielectric constant close to that of the transparent coupling disc material and the window material of the phototube. This reduces reflections at the epoxy interface, and helps maximize the light received for detection by the phototube 14.

Once the disc 24 is affixed to the photomultiplier tube 14 as shown in FIG. 7, the resulting structure is a phototube 14 which has a threaded stud to allow the screwing together of the phototube 14 and the light pipe 12. The front surface 28 of the disc is sized to match the surface 18 of the light pipe. To eliminate reflective air gaps between the surface 28 of the disc and the surface 18 of the light pipe, an optical coupling grease is applied liberally to one or both of the surfaces. However, it is noted that with very precise machining of the surfaces 18, 28, the use of optical coupling grease could possibly be omitted. The entire phototube/disk structure is then screwed into connection with the light pipe 12 until the surfaces 18, 28 are flush with one another. The coupling thus complete, the operation of the phototube may then commence.

In the preferred embodiment of the present invention, the threaded stud 30 of the optical coupling disc 24 is an integral part of the disc 24. It is necessary that the material of the disc 24 is transparent to the wavelengths of light which is to be detected by the phototube 14. In the present embodiment, the wavelengths used include visible and ultraviolet light. The disc 24 is therefore machined from a single piece of ultraviolet transmitting (UVT) Lucite ® (a registered trademark of E.I. DuPont Corp.). The Lucite material provides a transmission characteristic centered at about 425 nm, with a half power bandwidth of about 60-100 nm. In general, it is desirable to use a disc material with an index of refraction close to that of the light pipe material. This helps reduce optical reflections at the interface between the materials.

The disc is most easily machined on a lathe, and the stud, with threads, is an integral part of the material. Thus, light is transmitted through the stud 30, as well as through the rest of the disc 24. After machining, the surfaces of the disc 24 are polished using conventional plastic buffing techniques, to enhance its light transmitting capabilities. The thread size used for the stud 30 and receiving insert 20 is optional. However, a thread size of ⅜-16 UNC accomodates a great variety of electro-optic transducers, and provides a mechanical joint of adequate mechanical strength for most conventional uses of such transducers. The stud length in the preferred embodiment is approximately 1.5 times its diameter, and the stud is threaded over most of its length so that a sound mechanical joint can be formed with the threads of the tapped hole 20. In the preferred embodiment, the tapped hole is about twice as deep as the length of the stud 30.

As shown in FIG. 7, the threads are relieved near the base of the stud so that the disc 24 can be screwed flush against the flat surface 18 of the tube 12. Also, the end of the stud 30 is slightly chamfered to facilitate engagement of the stud threads with those of the tapped hole. In the preferred embodiment, the disc 24 is 3 inches in diameter. The thickness of the disc is not critical, but should be made large enough to provide good mechanical strength. In the preferred embodiment, a nominal thickness of 0.25 inches is used.

While the invention has been particularly shown and described with reference to a preferred embodiment thereof, it will be understood by those skilled in the art that various changes in form and details may be made therein without departing from the spirit and scope of the invention as defined by the appended claims.

The present invention provides an optical connection which allows an electro-optical device, such as a transducer, to be quickly and easily installed in or removed from a transparent light-conducting material. The invention also allows such a transducer to be reproducibly positioned without the need for additional fixtures. However, a number of different configurations might be used to accomplish the same coupling function of the present invention. It is first noted that if the transducer and the transparent material were made with the stud and the receiving hole built into their basic structure, the disc might not be necessary. The preferred embodiment provides the coupling disc so as to be adaptable to current commercially available transducers. However, the key feature of having the stud and hole which engage one another to allow the transducer to be removably secured to the transparent material could possibly be implemented without the disc.

A second notable variation involves the location of the hole and the stud. It is the relative engagement of the stud and the hole which allow the coupling of the transducer and the transparent material. Therefore, the stud might be located on the transparent material while the hole was located on the transducer body or on the disc. For example, the surface of the transparent material could be machined to form the stud extending outward, and the disc would then be secured to the transducer and would have a hole which engaged the stud, As a possible alternative, the hole could be formed directly into the window surface of the electro-optical device.

When using the disc, it is not necessary that the stud on the disc be threaded and that there be a tapped hole in the transparent material. Another scheme could involve a spring loaded stud on the disc and a smooth hole in the transparent material. The stud, attached to the electro-optical device, would slide into the hole so that the electro-optical device would then be held in place by friction between the stud and the hole.

The coupling disc of the preferred embodiment has a circular shape. However, the disc could just as easily have a square or rectangular shape to accomodate transducers and transparent mediums of different sizes. In addition, the electro-optical device of the preferred embodiment is a photomultiplier tube, but the present invention can be used with nearly any other type of electro-optical device, such as image intensifier or even a light source which transmits light into the transparent material.

We claim:

1. An apparatus for coupling an electro-optical device to a transparent material, comprising:
   a stud extending parallel to a coupling axis along which the electro-optical device and transparent material are coupled, the stud engaging a receiving hole in which the stud is removably secured, the stud and the hole permitting light to be transmitted therethrough with each being fixedly located relative to a different one of the electro-optical device and the transparent material, and being located opposite one another during coupling such that relative motion of the electro-optical device and the transparent material toward one another along the coupling axis results in the engagement of the stud with the hole.

2. An apparatus according to claim 1 wherein the stud has threads along an outer surface and the receiving hole has threads along an inner surface which mesh with the threads of the stud.

3. An apparatus according to claim 1 further comprising a transparent disc to which the stud is secured.

4. An apparatus according to claim 3 wherein the disc is secured to the electro-optical device and the hole is fixed relative to the transparent material.

5. An apparatus according to claim 4 wherein the disc is secured to the electro-optical device with transparent epoxy.

6. An apparatus according to claim 3 wherein the receiving hole is formed directly in the transparent material.

7. An apparatus according to claim 1 wherein the electro-optical device is an electro-optical transducer.

8. An apparatus according to claim 1 wherein optical grease is used between the electro-optical device and the transparent material.

9. An apparatus according to claim 2 wherein the stud is cylindrically shaped.

10. An apparatus according to claim 1 wherein the stud is formed of a transparent material.

11. A connector for coupling an electro-optical device to a transparent material coupling:
    a transparent coupling element having a first surface secured to a surface of the electro-optical device through which light is transmitted, the coupling element having a stud extending from a side opposite the first surface, the stud having threads about its circumference meshing with a threaded hole formed in the transparent material.

12. A connector according to claim 11 further comprising a layer of optical grease between the transparent material and the coupling element.

13. A connector according to claim 11 wherein the coupling element is secured to the surface of the electro-optical device with a transparent epoxy.

14. A connector according to claim 13 wherein the epoxy is flexible when dry.

15. A connector according to claim 13 wherein the epoxy is of a polyurethane base.

16. A connector according to claim 11 wherein the electro-optical device is a photomultiplier tube.

17. A connector according to claim 11 wherein the transparent material is part of a light pipe.

18. A connector according to claim 11 wherein the electro-optical device is an optical transducer and the first surface of the coupling element has an area which closely matches the photoactive area of the optical transducer.

19. A connector according to claim 11 wherein the material of the coupling element is transparent to ultraviolet light.

20. A connector according to claim 11 wherein the coupling element including the stud is formed from a single piece of material.

21. A connector according to claim 11 wherein the stud is sized to provide adequate mechanical strength to support the weight of the electro-optical device when connected to the transparent material.

22. A connector according to claim 11 wherein the stud is cylindrical in shape and has threads about its circumference.

23. A connector according to claim 22 wherein the hole has a cylindrical insert affixed therein, the insert having threads along its inside surface which mesh with the threads of the stud.

24. A connector according to claim 11 wherein the coupling element is disc-shaped.

25. An electro-optical detector comprising:
    a transparent material through which light is transmitted, the transparent material having a hole in a surface through which transmitted light exits;
    an electro-optical transducer receiving light through a window surface and outputting an electrical signal in response thereto; and
    a transparent coupling element having a first surface secured to the window surface of the transducer, wherein the coupling element is located between the transducer and the transparent material, the coupling element having a stud extending from a side of the coupling element opposite the first surface, the stud fitting within the hole of the transparent medium.

26. An electro-optical detector according to claim 25 further comprising a layer of optical grease between the coupling element and the transparent material.

27. An electro-optical detector according to claim 25 wherein the coupling element is secured to the window surface with transparent epoxy.

28. An electro-optical detector according to claim 25 wherein the stud is cylindrically shaped and has threads about its circumference.

29. An electro-optical detector according to claim 28 further comprising threads within the hole of the transparent material which mesh with the threads of the stud.

30. An electro-optical detector according to claim 25, wherein the stud and hole are positioned along an optic axis between the transparent material and the electro-optical transducer.

31. A method of coupling an electro-optical device to a transparent material, the method comprising:

providing a stud extending parallel to a coupling axis along which the electro-optical device and transparent material are coupled, the stud engaging a receiving hole within which the stud is removably secured;

fixedly locating each of the stud and the hole relative to a different one of the electro-optical device and the transparent material such that the stud and the hole are located opposite one another during coupling and permit light to be transmitted therethrough; and providing relative motion of the electro-optical device and the transparent material toward each other along the coupling axis such that the stud engages the receiving hole.

32. A method according to claim 31 wherein the step of providing a stud comprises providing a stud with threads along an outer surface of the stud which mesh with threads located on an inner surface of the hole.

33. A method according to claim 31 further comprising providing a coupling disc to which the stud is rigidly secured.

34. A method according to claim 31 wherein the step of fixedly locating each of the stud and the hole further comprises fixedly locating the stud relative to the electro-optical device and fixedly locating the hole relative to the transparent material.

35. A method according to claim 34 further comprising providing a transparent coupling disc to which the stud is rigidly secured, a surface of the coupling disc away from the stud being bonded to a surface of the electro-optical device.

36. A method of connecting an electro-optical device to a transparent material, the method comprising:

providing an internally threaded hole in a surface of the transparent material through which light passes;

securing a first side of a transparent coupling element to a surface of the electro-optical device through which light passes, the coupling element having a stud extending from a side of the coupling element opposite the first side, the stud being externally threaded about its circumference; and connecting the coupling element and the transparent material such that the external threads of the stud of the coupling element engage the internally threaded hole in the transparent material.

37. A method according to claim 36 further comprising applying a layer of optical coupling grease between the coupling element and the transparent material.

38. A method according to claim 36 wherein the step of securing a first side of a transparent coupling element to a surface of the electro-optical device further comprises securing the coupling element with transparent epoxy.

39. A method of coupling an electro-optical transducer to a transparent light transporting material, the method comprising:

providing a hole in a surface of the transparent material through which light exits;

securing in the hole a cylindrical insert having threads along its inner surface;

securing a first surface of a transparent optical coupling disc to an entrance window of the electro-optical transducer with transparent epoxy, the coupling disc having a threaded stud extending from a second surface which is on a side of the coupling disc opposite to said first surface;

applying a layer of optical grease to said surface of the transparent material; and connecting the coupling disc to the transparent material such that the threads of the stud mesh with the threads of the cylindrical insert, said connecting bringing the second surface of the coupling disc flush against said surface of the transparent material.

* * * * *